(12) United States Patent
Chiu et al.

(10) Patent No.: US 7,323,114 B2
(45) Date of Patent: Jan. 29, 2008

(54) METHOD OF MAKING OPTICAL ELEMENTS FOR AN OPTICAL DISC SYSTEM

(75) Inventors: Anthony M. Chiu, Richardson, TX (US); Danielle A. Thomas, Dallas, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 272 days.

(21) Appl. No.: 11/248,784

(22) Filed: Oct. 12, 2005

(65) Prior Publication Data

US 2006/0144813 A1     Jul. 6, 2006

Related U.S. Application Data

(62) Division of application No. 10/025,601, filed on Dec. 18, 2001, now Pat. No. 7,006,426.

(51) Int. Cl.
*B29D 11/00* (2006.01)

(52) U.S. Cl. .................. 216/24; 216/26; 216/41; 216/67; 438/689

(58) Field of Classification Search .......... 216/24, 216/26, 41, 67; 438/689, 710
See application file for complete search history.

(56) References Cited

U.S. PATENT DOCUMENTS 5,583,704 A     12/1996  Fujii
6,055,088 A     4/2000   Fix et al.
6,417,107 B1 *  7/2002   Sekimura .................. 438/689
6,529,454 B1    3/2003   Asoma et al.
6,717,893 B1    4/2004   Niss et al.
7,194,016 B2 *  3/2007   Bullington et al. ......... 372/108

\* cited by examiner

*Primary Examiner*—Shamim Ahmed
(74) *Attorney, Agent, or Firm*—Lisa K. Jorgenson; William A. Munck

(57) ABSTRACT

A large diameter glass wafer is pattern-etched to provide a plurality of elongated lens elements arranged side-by-side, the etching leaving small rods in place to keep the lens elements connected to the wafer during mirror processing. The etching provides curved surfaces for lenses and flat surfaces for mirrors. The mirrors are formed by selectively depositing reflective material on the flat surfaces. The reflective material may comprise an oxide, nitride, sulfide, or fluoride of a transition metal. The flat surfaces that define the mirrors are disposed at angles to the longitudinal dimension of each lens element. In use in an optical disc system, light from a laser diode is reflected by the mirrors and directed at an optical disc through a first lens. Light returns from the disc on a parallel path through a second lens, passes through the lens element, and is directed at a photodetector. The system may include an elongated base element attached to each lens element. Pattern-etching of a second glass wafer provides multiple base elements per wafer. Each base element may include an angled surface on which a reflective material is deposited to form a mirror for reflecting laser light during use in the system.

7 Claims, 3 Drawing Sheets

METHOD OF MAKING OPTICAL ELEMENTS FOR AN OPTICAL DISC SYSTEM

CROSS-REFERENCE TO RELATED APPLICATION

This application is a divisional of application Ser. No. 10/025,601, filed Dec. 18, 2001, now U.S. Pat. No. 7,006,426 from which priority is claimed.

BACKGROUND OF THE INVENTION

The present invention generally relates to optical elements for use in transmitting laser light to and from an optical disc, and more particularly to techniques for miniaturizing such optical elements.

SUMMARY OF THE INVENTION

A principle object of the present invention is an improvement in the manufacture of glass components and related structures used in optical disc systems. The present invention has advantageous application with miniature optical discs.

Other objects and advantages of the invention will become apparent from the following description of the invention, with reference to the accompanying drawings.

DETAILED DESCRIPTION OF THE INVENTION

Figure 1:
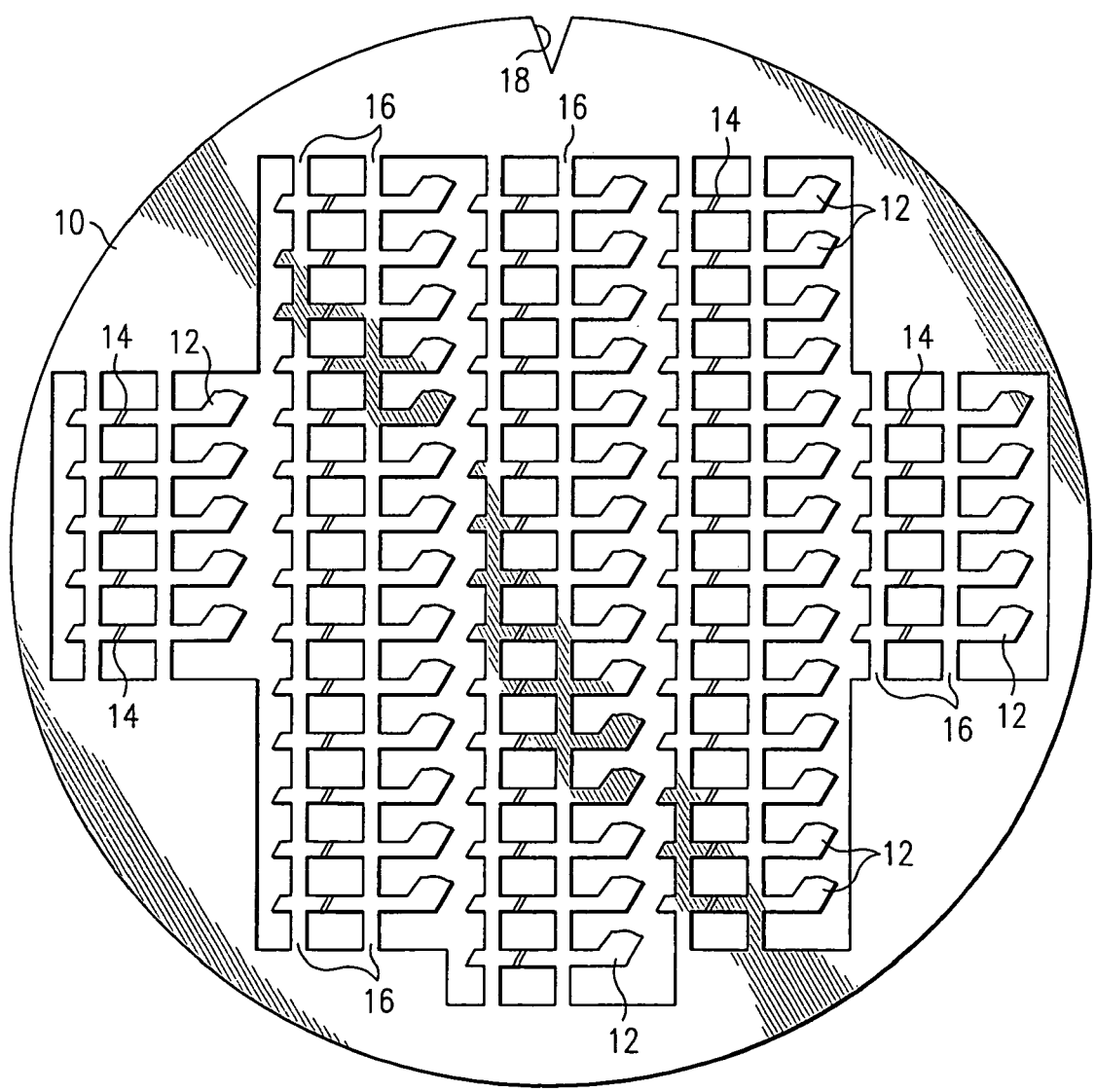
FIG. 1 is a plan view of a glass wafer that has been etched to provide multiple lens elements.

Referring specifically to FIG. 1, a clear glass wafer 10 is shown with multiple lens elements 12 therein, the lens elements having been defined by etching away portions of the wafer. Before the lens elements 12 are etched to arrive at the configuration shown in FIG. 1, certain surface features are formed, as described below in connection with FIG. 3. In particular, each element 12 has a slot 14 that preferably extends halfway down through the element to enable formation of a reflective surface therein. The elements 12 are supported as part of the etched wafer 10 by vertical glass rods 16 that remain after portions of the wafer have been etched out.

Starting wafers 10 can be cut from larger sheets of optical-grade glass in circular diameters that correspond to the size of conventional silicon wafers used in semiconductor manufacturing. Such wafers are typically sized in two-inch increments, such as six-inch, eight-inch, or ten-inch wafers. A V-groove 18 can be cut at one point in the circumference of the wafer 10 for automatic alignment purposes with handling equipment. Alternatively, as with some conventional silicon wafers, a flat edge extending several centimeters along one edge can be used instead of the V-groove 18 specifically shown. Such flat edges are typically used with six-inch silicon wafers. A preferred thickness for a six-inch glass wafer that is suitable for the present invention is about 0.75 mm.

The etching used to produce the structure shown in FIG. 1 can be accomplished using techniques that are well known in the semiconductor industry. A conventional photoresist is applied to the starting wafer. Then, an image of the pattern of material to be etched out is exposed on the photoresist using conventional semiconductor photolithography. The exposed photoresist is then dissolved and removed from the wafer. Next, the wafer is subjected to a plasma etching technique that cuts straight through the glass wafer in the areas that are not covered by the photoresist. Such plasma etching techniques are conventional and are used for etching silicon dioxide and other glass-like materials in semiconductor processing. The remaining photoresist is then removed from the wafer.

Now referring to FIG. 2, a glass wafer 20 is shown after it has been etched using a different pattern to produce multiple base elements 22, which are interconnected with each other and the wafer 20 by glass rods 24 in a manner similar to that previously described in connection with wafer 10 of FIG. 1. After formation of the wafers 10 and 20 in the configurations shown in FIGS. 1 and 2, the lens elements 12 and base elements 22 are separated from the wafers by cutting through the rods 16 and 24. The cutting operation can be performed using a conventional diamond saw process.

Figure 3:
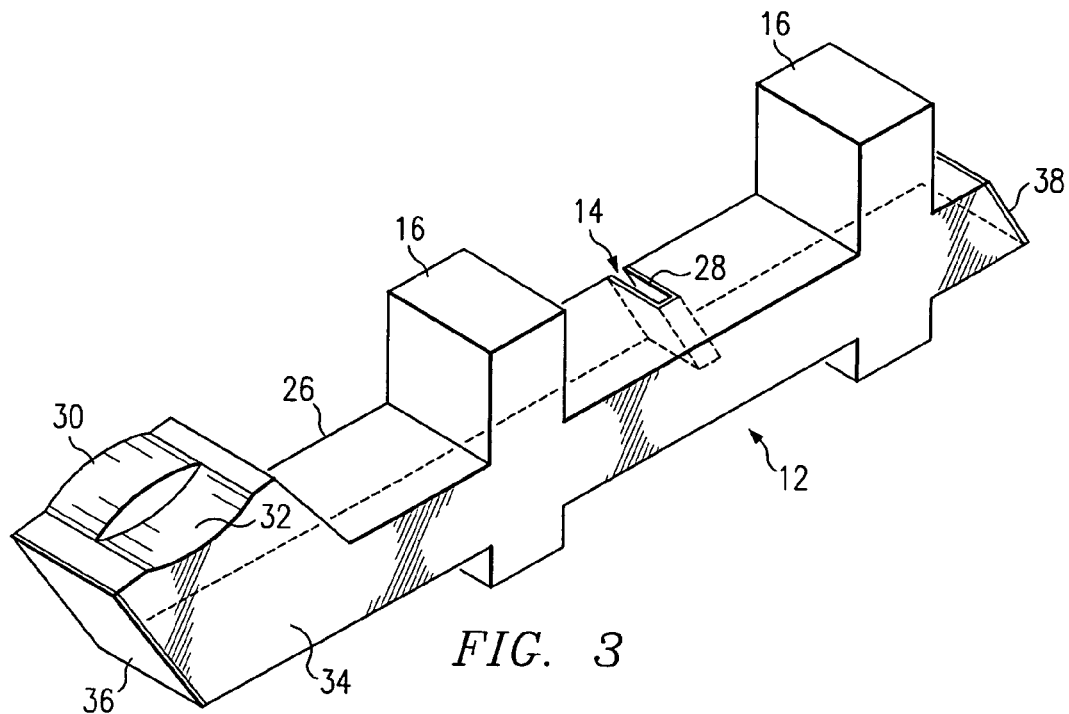
FIG. 3 is a perspective view of a lens element after it has been separated from the wafer of FIG. 1, the view looking at the back side of the lens element.

FIG. 3 shows additional details of one of the lens elements 12 that has been separated from its starting wafer. The slot 14 can be seen extending from a front surface 26 to a depth of almost exactly one-half the thickness of the element 12. A reflective film is formed on the walls within the slot 14 to provide a mirror 28. A front lens 30 is formed at one end of the element 12 extending inward from the front surface 26. A back lens 32 is juxtaposed next to the front lens 30 and extends inward from a back surface 34 of the lens element 12, each lens occupying almost exactly one-half the thickness of the element 12. It will be noted that each of the lenses 30 and 32 has a curved surface that retains the same curvature in cross-sectional planes parallel to the opposed front and back planar surfaces 26 and 34. This is caused by plasma etching straight down into the wafer. The two lenses 30 and 32 permit laser light to enter and exit the lens element 12 along different parallel paths, as explained below. Partially reflective mirrors 36 and 38 at opposite ends of the element 12 are used to reflect light beams traveling through the lens element.

Various reflective thin films formed on the glass surface of the elements 12 and 22 are suitable for the present invention. The reflective thin films preferably include a transition metal with a high reflection value in a form that is suitable for conventional deposition techniques. Certain oxides, nitrides, sulfides, and fluorides of such metals are stable, highly reflective and suitable for deposition on glass surfaces. Of these materials, our experiments show that titanium nitride meets these criteria and can be deposited in different thicknesses to achieve partial reflectivity of a desired value.

Mirrors 36 and 38 are constructed to be about 62 percent reflective. This is preferably accomplished during processing by depositing a thin titanium nitride film on the angled surfaces at the opposite ends of the lens element 12 and on the walls within the slot 14. The thickness of the titanium nitride film is controlled to achieve the preferred 62 percent reflectivity. Mirror 28 can be made with a like thickness of titanium nitride, or can be provided with a much thicker titanium deposition to make it much more reflective, preferably at least 90 percent reflective. The mirrors 28, 36, and 38 preferably comprise multiple film layers including a protective outer coating.

Figure 4:
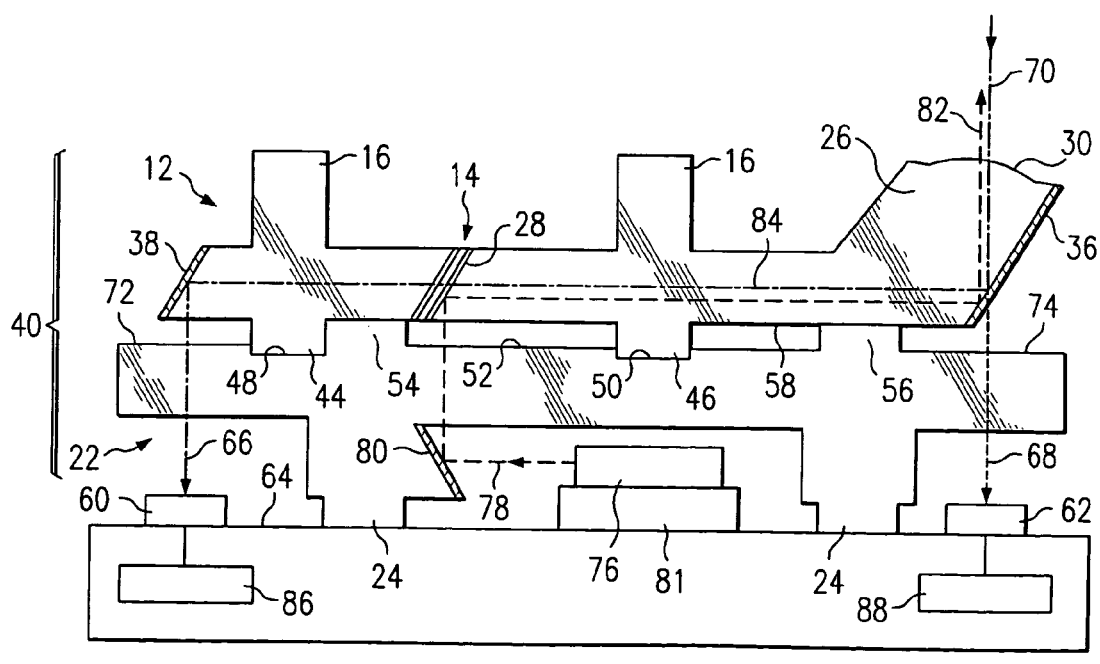
FIG. 4 is a side view of an assembled optical unit and supporting semiconductor chip that provides an electro-optical interface, the optical unit including a lens element mounted on a base element.

Referring to FIG. 4, a side view of an assembled optical unit 40 is shown supported by a semiconductor chip 42, which functions as an electro-optical interface for the optical unit 40. The optical unit 40 and chip 42 together define an electro-optical device for reading an optical disc (not shown). The optical unit 40 includes a lens element 12 mounted on a base element 22 in the manner indicated. In particular, extensions 44 and 46 of the rods 16 of lens element 12 fit into corresponding recesses 48 and 50 in the top surface 52 of the base element 22. Extensions 54 and 56 of the rods 24 of the base element 22 rest against the bottom surface 58 of the lens element 12. The mating of the rod extensions 44 and 46 in the respective recesses 48 and 50 achieves precise optical alignment of the lens element 12 with the base element 22. Similar recesses can be provided in the top surface of the semiconductor chip 42 for receiving the ends of the rods 24 on the bottom of the base element 22. Such recesses are preferred but are optional. External fixtures can be used as an alternative assembly technique and adhesive can be applied to the mating surfaces. FIG. 2 shows the base elements 22 without recesses for use in such an alternative assembly technique.

Photodetectors 60 and 62 are provided at the upper surface 64 of the semiconductor chip 42. The photodetectors 60 and 62 are aligned with respective light beams 66 and 68 that originate from a light beam 70 returning from an optical disc (not shown) entering the lens element 12 through the back lens 32. The split-beam approach using a pair of photodetectors 60 and 62 as depicted in FIG. 4 compares corresponding electrical signals within the chip 42 to eliminate unwanted signal noise. Band-pass filters (not shown) can also be added on surface portions 72 and 74 of the upper surface 52 of the base element 22 in the path of light beams 66 and 68 to filter out unwanted noise. Alternatively, the entire base element 22 can be clad with a thin film that filters out unwanted light noise.

Mounted above the semiconductor chip 42 is a laser diode 76 that emits a laser light beam 78, which is reflected upward by a mirror 80 on a 45° angled surface of the base element 22. Mirror 80 is constructed to be nearly 100 percent reflective. The laser diode 76 is supported by a mounting block 81 that enables precise alignment of the light beam 78 with the mirror 80. The light beam 78, after reflection by the mirror 80, passes through the base element 22 and enters the lens element 12 just beneath the slot 14. The light beam 78 is substantially reflected by the mirror 28 in the slot 14 back to the right in the view of FIG. 4 horizontally at the mirror 36. Mirror 28 is oriented at a 45° angle to reflect the upwardly directed beam horizontally (or longitudinally with respect to the lens element 12) at the mirror 36.

Because the mirror 36 is constructed to be about 62 percent reflective, about 62 percent of the light beam 78 is reflected up and passes out through the lens 32 as focused laser light beam 82. Mirror 36 may be oriented at 45° to the longitudinal direction of the lens element 12 or may have a slightly different angle to accommodate the orientation of the lenses 30 and 32. The light beam 82 is directed at an optical disc (not shown), which partially reflects back the information-containing beam 70. The entering beam 70 returns on a path that is spaced from and generally parallel to the out-going beam 82, as directed by optics (not shown) between the lens element 12 and the optical disc that is being read by the system.

Referring to FIGS. 3 and 4 together, the information-containing light beam 70 enters the lens element 12 through the back lens 32, which directs the beam downward at the mirror 36. The light beam 70 is split by the mirror 36 into horizontal and downward components, the downward component corresponding to the beam 68 that impinges on photodetector 62, as previously discussed. The horizontal component 84 of the beam 70 that is reflected by the mirror 36 passes through the back half of the lens element 12, thus avoiding the mirror 28 in the slot 14, and continues on horizontally striking the mirror 38. The mirror 38, which is oriented at 45° to the horizontal direction, reflects most of the horizontal component 84 of the information-containing beam 70 downward as beam 66, which impinges on the photodetector 60. The photodetector 60 is in electrical communication with analog-to-digital (A/D) converter circuitry 86 within the semiconductor chip 42. Likewise, the photodetector 62 is in electrical communication with A/D converter circuitry 88 within the chip 42. The A/D converters 86 and 88 are connected to logic circuitry within the chip 42 that performs data and control functions and communicates with other system components (not shown).

Figure 2:
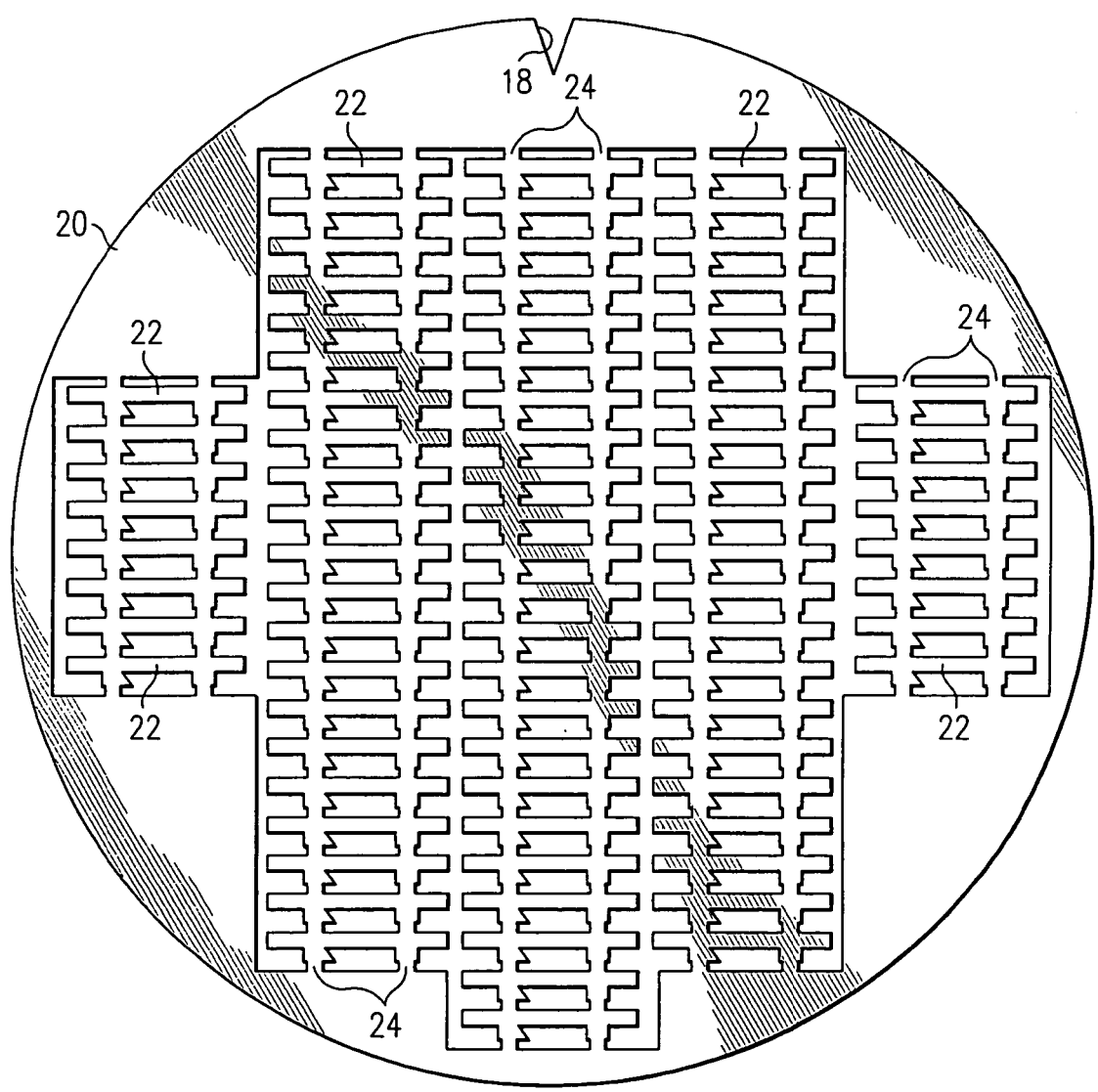
FIG. 2 is a plan view of a glass wafer that has been etched to provide multiple base elements.

In the previous description, the lens element 12 and base element 22 are cut from separate wafers 10 and 20, shown in FIGS. 1 and 2. This is useful to permit different processes to be performed on the separate parts. For example, the mirror 80 may be formed in a different way from mirrors 28, 36 and 38. Since mirror 36 needs to be partially reflective to split the returning beam 70 into two components, the mirrors 28 and 38 can be made partially reflective for simplification of the process. However, it will be appreciated that mirrors 28 and 80 can be made fully reflective or almost fully reflective, consistent with process design. If the base element 22 is processed separately from the lens element 12, it is convenient to use a different material to make mirror 80 fully reflective. However, if a more complex process is used to permit forming both partially reflective mirror surfaces and fully reflective mirror surfaces during the process sequence, then the lens element 12 and base element 22 can be cut from a single glass wafer.

Another consideration is the desirability of using essentially identical photodetectors 60 and 62. Therefore, if mirrors 36 and 38 are each made to be about 62 percent reflective, then about 38 percent of the returning beam 70 will fall on each of the photodetectors 60 and 62. The mirror 28 can be made in a similar way to mirrors 36 and 38 to be partially reflective, or can be made to be essentially fully reflective. It will also be appreciated that if mirror 38 is made to be almost fully reflective, mirror 36 can be made to be about 50 percent reflective to have the same light intensity impinging on the photodetectors 60 and 62. However, this will reduce the intensity of the out-going laser light beam 82.

According to the preferred process, and with reference to FIGS. 1 and 3, multiple lens elements 12 are made from a glass wafer, such as the wafer 10, as follows. A first photoresist pattern is formed with openings that define the slots 14 for each of the lens elements 12. Then, a conventional fluoride-based plasma etch step is performed for a time duration that etches openings corresponding to the slots 14 to a depth almost exactly halfway through the wafer 10. Then, a conformal titanium nitride deposition step is performed to coat the walls within the openings with a thin film of titanium nitride, one surface of which later defines mirror 28. The thickness of the titanium nitride deposition is preferably controlled to make the mirror 28 more than 90 percent reflective. The photoresist is then stripped and a second photoresist pattern is formed that has openings that define the angled surfaces at the opposite ends of each lens element 12 where the mirrors 36 and 38 are to be formed. A second plasma etch is performed to cut a second set of openings vertically down into the wafer 10, the openings having walls that include the surfaces on which the mirrors 36 and 38 will be formed. Then, a second conformal titanium nitride deposition step is performed to coat the walls with the second set of openings with titanium nitride, the walls including surfaces that define the position of the mirrors 36 and 38 on the finished lens elements 12. The second photoresist pattern is then stripped off the wafer 10. The thickness of the second titanium nitride deposition is preferably controlled so that the mirrors 36 and 38 are very nearly 62 percent reflective.

The process continues with formation of a third photoresist pattern on the wafer 10 with openings for defining the front lens 30 of each element 12. A plasma etch cuts down into the wafer 10 from the front surface 26 to a depth that is almost precisely halfway through the thickness of the wafer, which is achieved by controlling the etch duration. When the lens elements 12 are later separated from the wafer 10, the front lens 30 of each element 12 will be provided by this patterning and etching sequence.

Next, the wafer 10 is turned upside down and a fourth photoresist pattern is formed on the back side of the wafer 10 to define the surfaces that will become the back lens 32 of each lens element 12. Then, a plasma etch is performed to etch openings in the wafer 10 through corresponding openings in the photoresist pattern to define surfaces that include the surfaces of each back lens 32 of each lens element 12. The fourth photoresist pattern is then stripped away. As seen in FIG. 3, the result of the etching is that back lens 32 is defined by a surface cut straight down from the back surface 34 halfway through the lens element 12.

A fifth photoresist pattern is formed to define the outlines of the lens elements 12, as shown in FIG. 1, with their connecting rods 16. This photoresist pattern can be formed on the front side of the wafer 10, or a mirror-image pattern can be formed on the back side. A plasma etch then is performed to cut through the wafer 10 to provide the structures shown in FIG. 1. Individual lens elements 12 are then provided by cutting the rods 16 as previously described.

A similar but less complicated sequence of steps can be used to form the base elements 22 within the wafer 20 of FIG. 2. Since it is desirable for mirror 80 to be fully or almost fully reflective, a relatively thick titanium nitride deposition can be used. Alternatively, an aluminum deposition can be performed. In either case, the deposition step proceeds after appropriate windows are etched through a photoresist pattern. If aluminum is used for the mirrors 80 of each base element 22, a nearly 100 percent reflective surface can be achieved. To keep the mirrors 80 from oxidizing and adversely affecting their reflectivity, a thin glass layer is deposited on the aluminum immediately after the metal deposition step.

Although preferred embodiments of the invention have been described, it will be appreciated that various changes can be made without departing from the spirit and scope of the invention as defined by the appended claims.

What is claimed is:

1. A method of making optical elements for an optical disc system, comprising:
    providing a glass wafer of a diameter sufficiently large to form a plurality of lens elements side-by-side therein;
    selectively etching a lens in each lens element;
    selectively etching angled surfaces in each lens element;
    depositing a reflective material on the angled surfaces;
    selectively etching the outline of each lens element leaving rods connecting the lens elements to the wafer; and
    cutting through the rods to separate the lens elements from the wafer.

2. The method of claim 1 wherein the reflective material comprises an oxide, nitride, sulfide, or fluoride of a transition metal.

3. The method of claim 2 wherein the reflective material comprises titanium nitride deposited to a thickness that forms partially reflective mirrors.

4. The method of claim 1 wherein a second large-diameter glass wafer is provided to form a plurality of base elements, and the method includes:
    selectively etching an angled surface on each base element;
    depositing a second reflective material on the angled surface to provide a fully reflective mirror;
    selectively etching the outline of each base element leaving rods connecting the base elements to the second wafer; and
    cutting through the rods to separate the base elements from the second wafer.

5. The method of claim 4 wherein the second reflective material comprises aluminum.

6. The method of claim 4 further comprising assembling each lens element with a base element to align optical paths for light passing therethrough.

7. The method of claim 1 wherein the lens is etched part way into a first side of the lens element, and further comprising selectively etching a second lens juxtaposed with the first-recited lens, the second lens being etched part way into the lens element from a side opposite from the first side to provide separate paths for light leaving the lens element and returning into the lens element.

* * * * *